June 11, 1968 K. W. REID 3,387,897
TRACK SHOE
Filed April 12, 1965 4 Sheets-Sheet 1

KEVIN WILLIAM REID
INVENTOR.
by Martin J Marcus
AGENT

June 11, 1968     K. W. REID     3,387,897
TRACK SHOE Filed April 12, 1965     4 Sheets-Sheet 2

KEVIN WILLIAM REID
INVENTOR
by Martin J Marcus
AGENT.

June 11, 1968

K. W. REID 3,387,897

TRACK SHOE

Filed April 12, 1965

KEVIN WILLIAM REID

INVENTOR by Martin J Marcus

AGENT

United States Patent Office 3,387,897
Patented June 11, 1968

3,387,897
TRACK SHOE
Kevin William Reid, Greenfield Park, Quebec, Canada, assignor of one-third each to Canadian International Paper Company, Montreal, Quebec, and North Shore Paper Company, Montreal, Quebec, Canada, and Abitibi St. Anne Paper Ltd., all corporations of Quebec
Filed Apr. 12, 1965, Ser. No. 464,254
Claims priority, application Canada, Apr. 14, 1964, 900,326
16 Claims. (Cl. 305—41)

This invention relates to tracks for track-laying vehicles. More particularly, it relates to improvements in the track shoe forming a part of the aforementioned tracks and to an improved track consisting of a plurality of track shoes interconnected by flexible members and including means to restrict relative movement of adjacent shoes to prevent excessive shearing and bending stresses in the flexible member intermediate said adjacent shoes.

In efforts to mechanize wood harvesting operations the pulp and paper industry became in need of a high traction vehicle which can advantageously and economically be employed in the extremely adverse environment of cut-over forests. So far none of the conventional tracked vehicles, either of the pinless or of the pin type, have proven satisfactory.

Conventional track-laying vehicles, in both military and commercial application, utilize tracks which in one form or another are based on the design principles of either the "pin-type" or "pinless-type" track. In the slow speed application of heavy machinery in the agricultural and construction fields the pin-type crawler track mostly predominates. The pinless-type track, consisting of flexible endless bands with track shoes secured to them in a transverse direction are commonly employed in high speed vehicles which in most cases utilize sprung wheels to provide a softer ride.

The pin-type track, due to excessive wear in the numerous pin joints is subject to considerable track elongation which results in difficulties at the sprocket due to overpitching. Maintenance and repair costs are high and heavy track weight imposes serious limitations on vehicle manoeuverability and on efficient utilization of the prime mover power.

The pinless type-track utilizing the flexible, endless band is seriously handicapped by the limited strength and short service life of the band. The use of this type of track in all presently available forms, whether cable reinforced or not, has not proven economical for use in the harvesting operations of the pulp and paper industry. Tracks of the "ladder-type" design, with their customary wide spacing between adjacent track bars, expose the track bands to the ground making them vulnerable to damage due to piercing and cutting by stumps and rocks over which the vehicle must travel.

The extremely high torsional flexibility of the track bands renders track guidance extremely difficult. Misguiding of the tracks at the sprocket and even complete "throw-off" of the tracks are not uncommon. Under severe terrain conditions, i.e., over stumps or rocks, the track bands become excessively twisted between adjacent track bars or shoes which results in excessive shearing and bending stresses in the flexible band or member interconnecting the shoes ultimately causing track band failure.

It is therefore a primary feature to provide an improved track for a track laying vehicle specially adapted for travel in rough terrain.

Another feature of the present invention is the provision of an improvement of the tracks using flexible endless or splined bands.

Another feature of the present invention is the provision of improvements particularly to the non-stretchable, cable-reinforced type flexible band track.

Another feature of the present invention is the provision of tracks particularly suited for cross-country application under extreme terrain conditions.

According to one aspect of the present invention, there is provided an improvement in the flexible band type track by permitting closer spacing between the track bars thus protecting the bands and their edges from damage as a result of exposure to the ground.

According to one aspect of the present invention, there is provided an improvement in the flexible band type track by maintaining the flexibility of the track bands to a degree necessary for efficient operation.

According to one aspect of the present invention, there is provided an improvement in the flexible band type track by controlling its torsional, lateral, vertical and longitudinal stiffness which prevents damage of the bands due to overstressing and fatigue. By proper control of the torsional flexibility of the track there is provided a reduction in the shearing action between adjacent track shoes, thereby preventing the bands from being torn apart in transverse direction to its length. By control of the lateral flexibility there is provided an improvement in the track guidance and there is provided a limit in excess edge tension in the bands. By control of the vertical flexibility of the track the angular deflection of the band keeps within the permissible range which is of particular importance under reverse bending.

The effective control of the longitudinal relative movement of adjacent track bars results in control of the torsional flexibility of the tracks and permits closer spacing of track shoes.

According to one feature of this invention there is provided an improved track comprising: a pair of spaced apart track bands adapted to be joined to form a pair of spaced apart endless tracks, each said band being provided with a plurality of reinforcing cables embedded therein and running along the longitudinal axis of said belt; a plurality of spaced apart, transversely extending track bars interconnecting said pair of said spaced apart track bands and rigidly secured to the inside surface of said track bands, and a plurality of closely spaced apart, transversely extending, ground engaging track shoes rigidly secured to the outside surface of said track bands, each said track shoe including at least one lug extending therefrom on each side of the longitudinal axis of said track shoe and in a direction transverse to the longitudinal axis of said track shoe, one such lug being offset along said longitudinal axis by a distance equal to at least slightly more than the thickness of said other lug; whereby each adjacent track shoe is provided with a lug adjacent to, and cooperating with, an associated lug on said adjacent track shoe. By one preferred aspect of this feature of this invention there is provided an improved track comprising: a pair of spaced apart rubber track bands adapted to be joined to form a pair of spaced apart endless tracks, each said band being provided with a plurality of steel reinforcing, cables embedded therein and running along the longitudinal axis of said band; a plurality of spaced apart, transversely extending high strength metal track bars interconnecting said pair of spaced apart track bands and rigidly secured to the inside surface of said track bands; and a plurality of closely spaced apart, transversely extending, ground engaging track shoes rigidly secured to the outside surface of said track bands, each said track shoe including a pair of spaced apart, ground engaging edges extending upwardly and inwardly to merge in an arch portion at a pair of positions spaced longitudinally along the length of the track shoe, a central flat portion disposed between the arch portions; at least one guide horn extending transversely across said arch portion and spaced from a lateral edge thereof; and at least one bracket secured to said track shoe and extending outwardly from the curved portion of said arch portion and in a direction transverse to the longitudinal axis of said track shoe, one such bracket being more offset along said longitudinal axis than the other such bracket; and at least one quarto-cylindrical lug secured to an associated such bracket and extending with its arcuate portion outwardly from the curved face of said arch portion on each side of said arch portion and in a direction transverse to the longitudinal axis of said track shoe, one such lug being offset along said longitudinal axis by a distance equal to the thickness of said other lug, plus about one-sixteenth inch; whereby each adjacent track shoe is provided with a lug adjacent to, and cooperating with, an associated lug on said other adjacent track shoe.

By yet another preferred aspect of this feature of this invention, there is provided an improved track shoe adapted to be assembled in association with a plurality of like track shoes to form an improved track for a track laying vehicle, said track shoe comprising: a ground engaging portion and at least one lug, and preferably two spaced apart lugs extending from said track shoe on each side of the longitudinal axis of said track shoe and in a direction transverse to the longitudinal axis of said track shoe, one such lug being offset along said longitudinal axis by a distance equal to at least slightly more than the thickness of said other lug.

By one preferred aspect of this feature of this invention, there is provided an improved track shoe adapted to be assembled in association with a plurality of like track shoes to form an improved track for a track laying vehicle, said track shoe comprising: a pair of spaced apart, ground engaging edges extending upwardly and inwardly to merge in an arch portion; at least one guide horn and preferably two spaced apart guide horns extending transversely across said arch portion and spaced from a lateral edge thereof; at least one bracket and preferably two spaced apart brackets secured to said track shoe and extending outwardly from the curved portion of said arch portion and in a direction transverse to the longitudinal axis of said track shoe one such bracket being more offset along said longitudinal axis than the other such bracket; and one quartocylindrical lug secured to an associated and adjacent such bracket and extending with its arcuate portion outwardly from the curved face of said arch portion on each side of said arch portion and in a direction transverse to the longitudinal axis of said track shoe one such lug being offset along said longitudinal axis by a distance equal to the thickness of said other lug; plus about one-sixteenth inch.

Thus, in more concise terms, one specific embodiment of this invention provides an improvement to the flexible band type track by the installation of four lugs on each track shoe, located two on each end, and outside of the track bands; one lug being off-set to the one on the opposite side by the thickness of the lug plus approximately ⅟₁₆".

Figure 1:
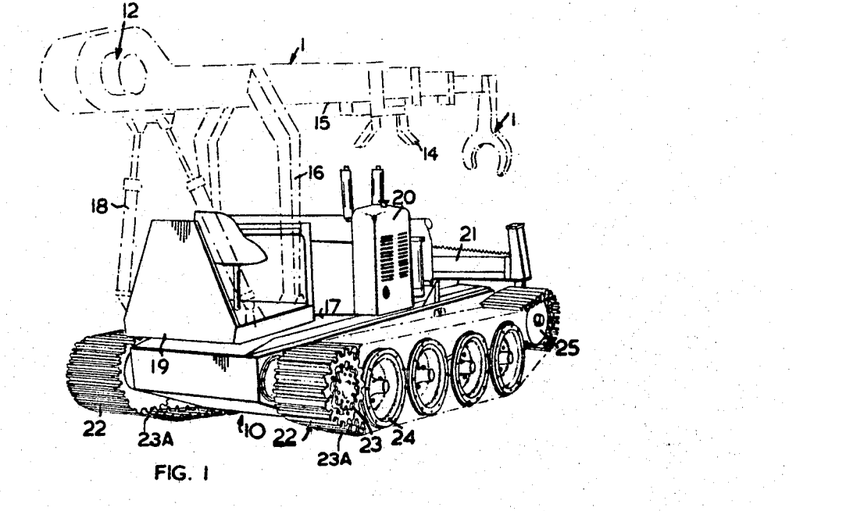
FIGURE 1 is a front perspective view, partly in phantom, of a full tree skidder employing the improved tracks of the present invention.

Turning now to FIGURE 1, there is shown one embodiment of a full tree skidder disclosed in United States Patent 3,227,295 issued Jan. 4, 1966.

Since the vehicle has been disclosed and claimed in the aforesaid application, no detailed description thereof will be given. However, a brief general description will be given. The vehicle 10 includes: a retractable, telescoping boom 11, winching means 12 associated with the boom 11; a grapple 13 secured to the free end of the boom 11′, a tree heeling device 14 secured to a fixed section 15 of the boom 11; an arch boom support 16 attached to the chassis 17; a vertically movable boom support 18 secured to a cockpit deck 19 slewably mounted on the chassis 17; a motor 20 secured to the chassis 17; a tree trunk 21 secured to the chassis 17; and a pair of tracks 22 each entraining a drive wheel 23, four ground engaging support wheels 24 and an idler wheel 25.

Figure 2:
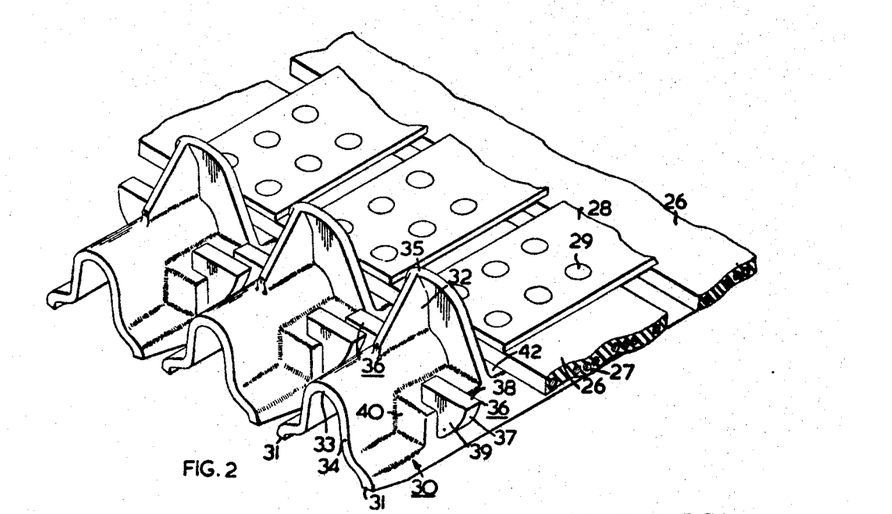
FIGURE 2 is a perspective view of a portion of an improved track according to one embodiment of this invention, employing track shoes according to one embodiment of this invention.

Turning now to FIGURE 2 there is shown a portion of a track 22 according to one embodiment of the present invention. The track includes a pair of spaced apart rubber track bands 26, each provided with a plurality, in this case eight, of reinforcing cables 27 embedded therein and running along the longitudinal axis of the band 26. The band 26 may be formed of natural rubber or of synthetic rubber such as GR-S, GR-A, butyl, etc. The reinforcing cable 27 is preferably formed of high tensile strength steel. The bands are maintained in their relatively fixed, spaced apart relation by means of a plurality of spaced apart, transversely extending track bars 28, each being secured to its associated portion of the track band 26 by a plurality, in this case six, rivets 29, the bars 28 being preferably formed of steel. It is to be noted that the track bars 28 form the inner race of the track 22 while the outer race is provided by a plurality of closely spaced, transversely extending track shoes 30, attached to the outside portion of the track bands 26 also by rivets 29.

Each track shoe includes a pair of spaced apart, ground engaging edges 31. The ground engaging edges extend upwardly and inwardly to merge in an arch portion 33 at a pair of positions spaced longitudinally along the length of the track with a central flat portion 42 disposed therebetween, the shape of the arch portion being so selected as to enable the arch to cooperate with the drive wheel 23 (see FIGURE 1) in a manner to be described hereinafter with respect to FIGURE 3. Spaced from each lateral edge 34 of each track shoe 30 is a guide horn 35 rigidified on the track shoe by means of brace 32. The purpose of guide horn 35 will be evident later in the description of FIGURE 3.

The adjacent track shoes are interassociated one with another according to one embodiment of the present invention, by the cooperation between adjacent restraining lugs 36. Each lug is of quartocylindrical shape, defined by an arcuate face 37, a radial face 38 and a pair of spaced apart, parallel side faces 39. As shown in FIGURE 2, each track shoe 30 is provided with one lug 36, on each of the curved faces of the arch 33, the opposed lugs 36 being differently off-set from the lateral edge 34 (and consequently from each other) by a distance equal to slightly greater than the thickness of the lug 36 usually about one-sixteenth of an inch. Consequently, when the adjacent track shoes 30 are assembled on the track bands 26 to form one track 22 according to this invention, the lug 36 on one track shoe 30 cooperates with the adjacent lug 36 on the adjacent track shoe 30 by having its respective sides 39 almost in contact with each other. In addition, the arcuate face 37 of one lug 36 of one track shoe 30 is almost in contact with a curved face of the arch portion 33 of its adjacent track shoe 30. It is thus evident from the latter feature that the lug on one shoe projects outwardly therefrom in a direction longitudinally along the length of the track a sufficient amount so as to project beyond the nearest edge of an adjacent shoe. With the lugs projecting both forwardly and rearwardly from each shoe, the overlapping lugs with respect to adjacent shoes limits the amount of vertical displacement of the adjacent shoes. The lugs 36 in this embodiment of the present invention are fixed to the curved portion of the arch 33 of the track shoe 30 by means of a bracket 40 integral with, or permanently affixed to, the curved face of arch portion 33.

Figures 3, 4:
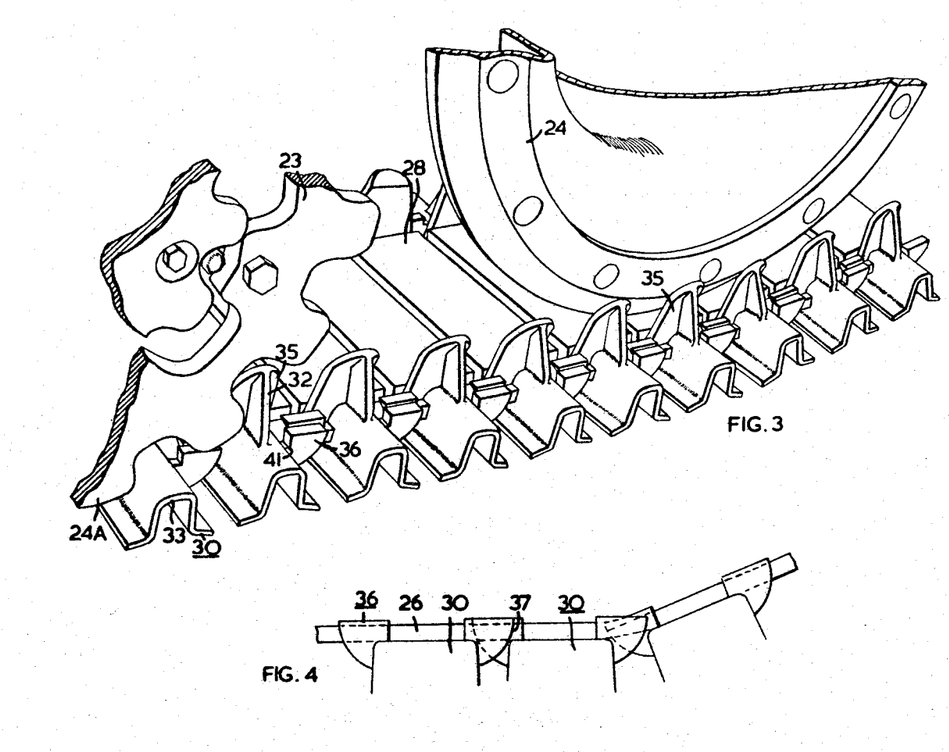
FIGURE 3 is a perspective view of a portion of an improved track according to another embodiment of this invention, employing track shoes according to another embodiment of this invention.
FIGURES 4, 5 and 6 are idealized side elevational views of the track according to this invention under normal operating conditions

Turning now to FIG. 3, another embodiment of a track 22 will now be described. A portion of the drive wheel 23 provided with a plurality of circumferentially spaced driving cogs 24A, which in sequence engage the curved portion of the arch portion 33 of the track shoes 30. In the embodiment illustrated, each drive wheel 23 consists of a pair of sprockets 23A disposed in spaced, parallel relationship and engage respectively the lugs located at opposed marginal edges of the track 22. It is also seen that the guide horns 35, as well as the lugs 36 are adapted to ride on the inside of the drive wheel 23 and drive cogs 24A (i.e., intermediate a pair of spaced planes defined by the spaced sprockets 23A). The guide horns 35 however are also adapted to ride on the outside of the road wheels 24, thereby to guide the track 22 around the road wheels. In the embodiment shown in FIG. 3, the lugs 36 are secured to the curved face of the arch portion 33 of the track shoe 30 by means of bracket extension 41 integral with the lugs 36. Of course, the cooperation between lugs 36 on one shoe and an adjacent track shoe 30 is the same as that described in FIG. 2 and is further demonstrated in FIGS. 4, 5 and 6.

In general terms, the purpose of the lugs is to combine the advantages of both the pinless- and the pin-type track by allowing the cables in the belt to take the tension only. The lugs, when in contact with adjacent track shoes provide a limit for the amount of compression in the cables which will cause kinking and thus substantially reduce or eliminate cable failure from such cause.

This is achieved by the fact that the contour of the lug outer face is such that at any angle of rotation (within the permissible range of the belts) between two track bars in the longitudinal direction of the belts the amount of permitted relative movement of adjacent shoes remains substantially the same. Normally, there is a clearance of approximately $\frac{1}{16}''$ maintained between the outer face of the lug and the wear face of the adjacent track shoe.

Figure 5:
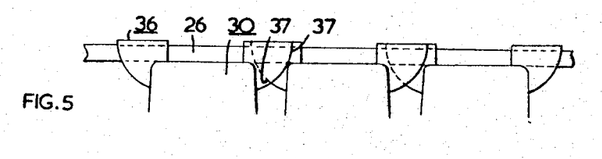
Figure 6:
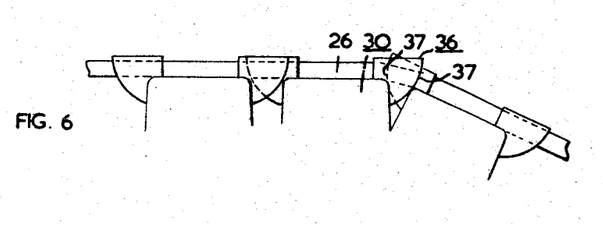

As shown in FIGS. 4, 5 and 6, and clearly in FIG. 5, when the tracks are running on even terrain the arcuate faces 37 are spaced from the track shoe 32 next adjacent thereto, and the track shoe 30 operates in the normal manner. Thus, the track is shown on level ground with clearance between lug faces and track shoes. As shown in FIG. 4, in the normal bend position (as when the track traverses the drive or idler wheels) the arcuate face 37 contacts the track shoe 30 next adjacent thereto when the angle between adjacent track shoes 30 reaches about 22½°. This angle may, however, be varied to satisfy individual conditions by varying the length of the radial side 38. Thus, the track is shown at maximum normal bend which is determined by the idler roadwheel or sprocket whichever has the smaller diameter. As shown in FIG. 6, the reverse bend position (as when the track traverses very uneven or rough terrain) provides a positive stop of rotation by contact of the arcuate faces 37 with the next adjacent track shoe 30 when the angle between adjacent track shoes 30 reaches about 25°. This angle too may be varied. Thus, the track is shown at the maximum reverse bend which is limited by the bridging effect due to the bottom edges of the track bars coming into contact with each other.

Figure 7:
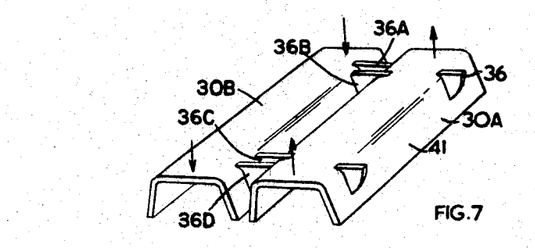
FIGURES 7, 8 and 9 are idealized perspective views of track shoes according to the present invention under adverse operating conditions.
Figure 8:
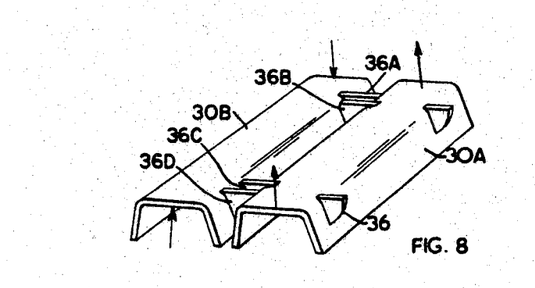
Figure 9:
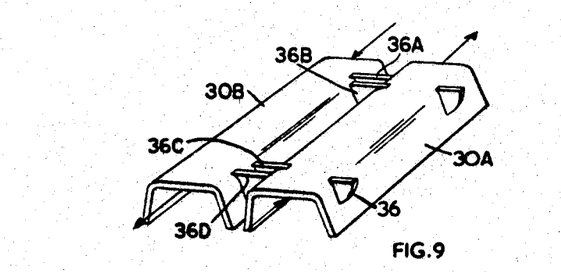

The lugs, under adverse operating conditions, control the flexibility of the track as follows and as shown in FIGURES 7, 8 and 9. As shown in FIGURE 7, foreshortening of the track belt due to vertical loading in the opposite direction of adjacent track shoes (as shown by the arrows) is controlled by the outer faces of two lugs on the same side of each track bar coming into contact with the wear faces of the adjacent track shoe. Twisting between two track shoes due to loading the same ends of adjacent track shoes in opposite directions (as shown by the arrows in FIGURE 8), is controlled by the outer faces of diagonally opposite lugs on each track shoe coming into contact with the wear faces of adjacent track shoes. In order to limit relative lateral displacement of the adjacent shoes by forces on the shoes, as indicated by the arrows in FIG. 9, the lugs have side faces adapted to abut the oppositely disposed side faces on a similar lug on an adjacent shoe. In referring to FIG. 7, the arrangement of lugs is illustrated wherein lugs 36A and 36D are secured to track shoe 30B and lugs 36B and 36C are secured to an adjacent track shoe 30A. The lugs 36B and 36C are offset from the lugs 36A and 36D such that the bearing faces are adapted to abut one another upon selected lateral displacement of the adjacent shoes.

As seen in FIG. 2, mutually opposed twisting of adjacent track shoes 30 to result in a potential shearing action is inhibited by contact between adjacent faces 39 of adjacent different lugs 36. The amount of twisting permissible is determined by the space between the adjacent lugs, and this space may, of course, be varied to suit individual conditions. Such twisting is also controlled by contact of the lugs on one shoe with the lug bearing surface of an adjacent shoe.

The clearances between the lug outer face and the track shoe should be determined by the amount of twist which can be tolerated over a given length of track (the minimum being center-to-center distance of adjacent road wheels). The clearance between lug faces should be the minimum to ensure adequate guiding of track at roadwheels, idler wheels and sprocket.

I claim:
1. A track shoe comprising:
 (a) a ground engaging side portion;
 (b) a relatively flat central portion on a side thereof opposite the ground engaging side in an assembled track; a pair of opposed relatively smooth side surfaces interconnecting the ground engaging portion and said flat central portion;
 (c) an arch portion, on each side of said central flat portion, extending in a direction away from the ground engaging side portion and being provided for engagement with a drive sprocket;
 (d) an upstanding horn, adjacent each end of said central flat portion, at a position intermediate said arch portions and the central flat portion, said horns extending in the same direction as said arches and providing a guide for wheels in an assembled track vehicle, said arch portions and said upstanding horns being disposed in spaced relation with respect to a longitudinal axis of said shoe;
 (e) a lug on each side of said longitudinal axis projecting outwardly from respective ones of said pair of opposite smooth side surfaces and adjacent each of said guide horns, each of said lugs projecting beyond said track shoe in a direction transverse to said longitudinal axis to thereby overlap an adjacent shoe in an assembled track, the lug on one side of the track shoe longitudinal axis at one end thereof being offset from the lug on the opposite side at the same end of the track shoe by a distance at least slightly more than the thickness of said other lug, and the lugs at the other end being similarly arranged each of said lugs having an arcuate surface on the portion which faces and overlaps a similar shoe adjacent thereto when in an assembled track and positioned for engagement therewith when in an assembled track to limit relative vertical displacement relative to the ground, adjacent shoes in a ground engaging portion of the track and also provide rolling contact of adjacent shoes whereby they are adapted to pivot relative to one another, each of said lugs having a flat bearing surface disposed in a plane normal to said longitudinal axis, the bearing surface of the respective lugs on opposite sides of the longitudinal axis at each of the opposite ends thereof being disposed in opposite directions facing one another whereby when assembled in a track, the bearing faces of the lugs on adjacent shoes are engageable to limit relative horizontal displacement of adjacent shoes in such track; and (f) a bearing surface on said track shoe adjacent each said lug and facing in a direction opposite to that of the arcuate outer surface of said lug, the bearing surface on one side of the longitudinal axis of the track shoe being in alignment with the lug on the opposite side thereof.

2. A track shoe as defined in claim 1 including a replaceable rigid bar anchored to said central flat portion, said rigid bar also having a flat portion on at least the central portion thereof to overlie said other flat portion.

3. A track shoe as defined in claim 1 wherein said ground engaging portion comprises a pair of flanges disposed in spaced relation and extending in the same direction as the longitudinal axis of the track shoe, said flanges at each end of the track shoe merging into said arch portions.

4. An improved track shoe adapted to be assembled in association with a plurality of similar track shoes to form an improved track for a track laying vehicle, said track shoe comprising:
(a) a pair of spaced-apart, ground-engaging edge flanges extending upwardly and inwardly to merge into an arch portion at a pair of positions spaced longitudinally along the length of the track shoe;
(b) a central flat portion disposed between said arch portions;
(c) a pair of guide horns located one at each side of said central flat portion adjacent respective arch portions, each guide horn being spaced from the end of said shoe;
(d) a pair of lugs projecting outwardly from the track shoe adjacent each said arch portion with one lug of said pair being on one side of the longitudinal axis and the other lug, on the other side thereof, each said lug extending in a direction transverse to the longitudinal axis of said track shoe, the lug on one side of the longitudinal axis adjacent one arch portion being offset along said longitudinal axis from the lug adjacent the same arch portion on the other side of the longitudinal axis by a distance equal to at least slightly more than the thickness of said other lug, each of said lugs having a flat bearing surface disposed in a plane normal to said longitudinal axis, the bearing surface of the respective lugs at each of the opposite ends of the track shoe being disposed in opposite directions facing one another whereby in an assembled track, the bearing faces on the lugs of adqacent track shoes are engageable to limit relative horizontal displacement of the adjacent shoes; and
(e) a bearing surface on said track shoe adjacent each said lug and facing in a direction opposite to that of the arcuate outer surface of said lug, the bearing surface on one side of the longitudinal axis of the track shoe being in alignment with the lug on the opposite side thereof.

5. An improved track shoe as defined in claim 4 wherein each of said lugs has an arcuate outer surface positioned to overlie the curved face of the arch portion of an adjacent shoe in an assembled track.

6. An improved track shoe adapted to be assembled in association with a plurality of similar track shoes to form an improved track for a track laying vehicle, said track shoe comprising:
(a) a pair of spaced-apart, ground-engaging edge flanges extending upwardly and inwardly to merge into an arch portion at a pair of positions spaced longitudinally along the length of the track shoe;
(b) a central flat portion disposed at a position between said arch portions;
(c) a pair of guide horns located one on each side of the central flat portion adjacent said arch portions and extending in a direction transverse thereacross, each guide horn being spaced from the end of said track shoe; and
(d) a quarter-cylindrical lug projecting outwardly from the curved face of the arch portion on each side of the longitudinal axis of the track shoe and extending in a direction transverse thereto, the lug at one side of the longitudinal axis at one arch portion being offset along the longitudinal axis from the lug at the same arch portion on the other side of the longitudinal axis by a distance equal to at least slightly more than the thickness of said other lug, each of said lugs having a flat bearing surface disposed in a plane normal to said longitudinal axis, the bearing surface of the respective lugs at each of the opposite ends of the shoe being disposed in opposite directions facing one another whereby in an assembled track, the bearing faces on the lugs of adjacent tracks are engageable to limit relative horizontal displacement of the adjacent shoes.

7. An improved track shoe adapted to be assembled in association with a plurality of similar track shoes to form an improved track for a track laying vehicle, said track shoe comprising:
(a) a pair of spaced-apart, ground-engaging edge flanges extending upwardly and inwardly to merge in an arch portion at each of opposite ends of the track shoe;
(b) a central flat portion disposed at a position between said arch portions;
(c) a pair of guide horns disposed in spaced relation longitudinally along said shoe and extending in a direction transverse to each of said arch portions, each guide horn being spaced from the lateral edges of the track shoe on each side of said central flat portion;
(d) a pair of brackets secured to said track shoe and extending outwardly from each of the curved faces of each of said arch portions and in a direction transverse to the longitudinal axis of said track shoe, one such bracket on each pair being disposed on one side of said longitudinal axis and the other bracket being disposed on the other side of the longitudinal axis, the brackets in each pair being offset from one another along said longitudinal axis; and
(e) a quarter-cylindrical lug secured to each of its associated and adjacent such bracket and extending with its arcuate portion outwardly from the curved faces of such portion on each side of the longitudinal axis of the track shoe and in a direction transverse thereto, one such lug at each of the ends being offset along the longitudinal axis from the corresponding lug on the other side of the longitudinal axis at the same end by a distance equal to at least the thickness of said other lug, plus about $\frac{1}{16}''$, each of said lugs having a flat bearing surface disposed in a plane normal to said longitudinal axis, the bearing surface of the respective lugs on opposite sides of the longitudinal axis at each of the respective ends of the track shoe being disposed in opposite directions facing one another whereby, in an assembled track, the bearing faces on the lugs of adjacent track shoes are engageable to limit relative horizontal displacement of the adjacent shoes.

8. An improved track shoe adapted to be assembled in association with a plurality of similar track shoes to form an improved track for a track-laying vehicle, said track shoe comprising:
   (a) a pair of spaced-apart, ground-engaging edge flanges extending upwardly and inwardly to merge into an arch portion on each of opposite ends of the track shoe;
   (b) a central flat portion disposed at a position between said arch portions;
   (c) a pair of guide horns extending in a direction transversely across each of said arch portions and at a position spaced inwardly from the respective end of the track shoe;
   (d) a pair of longitudinally spaced-apart quarter-cylindrical lugs including a bracket extension associated with one radial face thereof secured by said bracket extension to said track shoe with the arcuate portion extending outwardly from each of the curved faces of each said arch portions, one of each of said pair of lugs being on one side of the longitudinal axis of said track shoe and the other lug of each of said pair being on the other side thereof, one lug on one side of the longitudinal axis being offset from the lug at the corresponding end of the track shoe along the longitudinal axis of the shoe by a distance equal to the thickness of said other lug plus about $\frac{1}{16}''$, each of said lugs extending in a direction transverse to the longitudinal axis of the track shoe having a flat bearing surface disposed in a plane normal thereto, the bearing surfaces on the respective lugs at each of the opposite ends of the track shoe being disposed in opposite directions facing one another whereby in an assembled track the bearing faces on the lugs of the adjacent track shoes are engageable to limit relative horizontal displacement of the adjacent shoes.

9. An improved track comprising:
   (a) a reinforced flexible strip of material comprising reinforcing cables embedded in a rubber-like material and extending in a direction along the longitudinal axis of the track;
   (b) a plurality of track shoes anchored to said flexible strip in closely spaced relationship and each having a longitudinal axis transverse to the longitudinal axis of the track, each of said track shoes comprising:
      (i) a ground-engaging portion;
      (ii) a relatively flat central portion on a side thereof opposite to the side engaged by the ground;
      (iii) an arch portion on each side of said central flat portion extending in a direction away from the side engaged by the ground and being provided for engagement with a drive sprocket;
      (iv) an upstanding horn on each side of said central portion at a position intermediate said arch portions and the central flat portion, said horns extending in the same direction as said arches and providing a guide for wheels in an assembled track vehicle, said arch portions and said upstanding horns being disposed along the longitudinal axis of said track shoe; and
      (v) a lug on each side of the track shoe longitudinal axis adjacent each of said arch portions, each of said lugs projecting beyond said track shoe in a direction along the longitudinal axis of the track to overlap an adjacent shoe, the lug on one side of the track shoe longitudinal axis and at each end thereof being offset from the lug on the other side of the longitudinal at the same end of the track shoe by a distance at least slightly more than the thickness of said lug, each of said lugs having an arcuate surface on the portion thereof overlapping the adjacent shoe and disposed for engagement therewith upon selected relative vertical displacement relative to the ground of the adjacent shoes in a ground engaging portion of the track and also provide rolling contact of adjacent shoes whereby they are adapted to pivot relative to one another, each of said lugs having a flat bearing surface disposed in a plane normal to the longitudinal axis of the track shoe, the bearing surface of the lugs on each side of the longitudinal axis at each of the respective ends of the track shoe being disposed in opposite directions facing one another and engageable to limit relative horizontal displacement of the adjacent shoes.

10. An improved track comprising:
    (a) a reinforced flexible track band having a plurality of reinforcing cables embedded in a rubber-like material and running along the longitudinal axis of said band;
    (b) a plurality of track bars disposed on the inside surface of the track band and anchored thereto, said bars each having a relatively flat central portion and being located in spaced relationship longitudinally along the length of the band and normal thereto;
    (c) a plurality of ground-engaging members, one being associated with each of said track bars and being disposed on the outside surface of said track band, said ground-engaging members being anchored to the track band and the plurality of bars and ground-engaging members associated therewith together forming a plurality of track shoes, said track shoes being closely spaced longitudinally along the length of the track band and each having a longitudinal axis transverse to the longitudinal axis of the band, each of said shoes including at least one lug projecting therefrom on each side of the longitudinal axis of the track shoe adjacent each end thereof, each of said lugs extending in a direction transverse to the longitudinal axis of the track shoe and having an arcuate outer face to engage an adjacent track shoe and thereby limit relative vertical displacement relative to the ground of the adjacent shoes in a ground engaging portion of the track and also provide rolling contact of adjacent shoes whereby they are adapted to pivot relative to one another, one such lug at one end being offset from the other lug at the same end along the longitudinal axis of the track shoe by a distance equal to at least slightly more than the thickness of said other lug, each of said lugs having a flat bearing surface disposed in a plane normal to the longitudinal axis of the track shoe, the bearing surface of the respective lugs being in opposite directions facing one another and engageable with corresponding bearing faces of an adjacent shoe thereby to limit relative horizontal displacement of the adjacent shoes, each of said track shoes further including a bearing surface adjacent each of said lugs and engageable with the arcuate face of the lug on an adjacent track shoe, an upstanding horn located one on each side of the central flat portion of the track bar and a pair of arch portions adjacent respective ones of opposed ends of the track shoe.

11. An improved track shoe comprising:
    (a) a pair of longitudinally extending, reinforced flexible strips disposed side-by-side in laterally spaced relationship, each said strips being provided with a plurality of reinforcing cables embedded therein and running in a direction along the longitudinal axis thereof;
    (b) a plurality of track bars interconnecting said pair of strips and disposed in spaced relation longitudinally therealong, said bars each having a relatively flat central portion and being located on the inside surface of the flexible strips and anchored thereto;
    (c) a plurality of ground-engaging members, one being associated with each of said track bars and disposed on the outside surface of said reinforced flexible strips, said ground-engaging members being anchored to said flexible strip, said bars and ground-engaging member associated therewith together forming a plurality of track shoes disposed in closely spaced relationship longitudinally along the length of said strips, each of said track shoes having a longitudinal axis transverse to the longitudinal axis of the flexible strips and including at least one lug extending therefrom on each side of the longitudinal axis of said track shoe and in a direction transverse thereto, one such lug on one side of the longitudinal axis being offset from a lug on the other side of the longitudinal axis by a distance equal to at least slightly more than the thickness of said other lug, each of said lugs having a flat bearing surface disposed in a plane normal to the longitudinal axis of the track shoe, the bearing surface of the respective lugs on opposite sides of the longitudinal axis being disposed in opposite directions facing one another whereby the lugs on adjacent track shoes cooperate to limit relative horizontal displacement of the adjacent shoes, each of said track shoes further including a bearing surface adjacent each of said lugs and engageable with the arcuate face of the lug on an adjacent track shoe, an upstanding horn located one on each side of the central flat portion of the track bar and a pair of arch portions adjacent respective ones of opposed ends of the track shoe.

12. An improved track shoe comprising:
(a) a pair of laterally spaced longitudinally extending rubber track bands adapted to be interconnected in spaced relationship, each said band being provided with a plurality of reinforcing cables embedded therein and running along the longitudinal axis of the band;
(b) a plurality of spaced-apart, transversely extending high strength metal track bars anchored to each of said pair of spaced-apart track bands and disposed on the inside surface thereof each of said track bars having a relatively flat central portion;
(c) a plurality of transversely extending, ground-engaging members disposed on the outside surface of said track bands and anchored thereto, each one of said ground-engaging members being associated with a respective one of said track bars and together therewith defining a track shoe, said track shoes being disposed in closely spaced relationship longitudinally along the bands and having a longitudinal axis transverse to the longitudinal axis of said bands, each of said track shoes including a pair of lugs projecting therefrom adjacent each end of the track shoe, one lug of each pair being on one side of the longitudinal axis of said track shoe and the other lug being on the other side thereof, said one lug being offset along said track shoe longitudinal axis from said other lug by a distance equal to at least slightly more than the thickness of the other lug, each of said lugs having a flat bearing surface disposed in a plane normal to said track shoe longitudinal axis, the bearing surface of the respective lugs on opposite sides of the track shoe longitudinal axis at each end of the track shoe being disposed in opposite directions facing one another whereby each shoe is provided with a lug adjacent to and cooperating with an associated side of a lug on an adjacent track shoe to limit relative horizontal displacement of the adjacent shoes, each of said track shoes further including a bearing surface adjacent each of said lugs and engageable with the arcuate face of the lug on an adjacent track shoe, an upstanding horn located one on each side of the central flat portion of the track bar and a pair of arch portions adjacent respective ones of opposed ends of the track shoe.

13. An improved track shoe comprising:
(a) a pair of rubber track bands disposed side by side in spaced relationship and each being provided with a plurality of steel reinforcing cables embedded therein running in a direction along the longitudinal axis of said bands;
(b) a plurality of high strength metal track bars spaced longitudinally along the bands and anchored thereto to interconnect the same in said spaced relationship, said bars being disposed on the inside surface of said track bands; and
(c) a plurality of ground-engaging members disposed transversely to the longitudinal axis of said bands on the outside surface thereof and anchored thereto, each ground-engaging member being associated with one of said track bars and together therewith defining a track shoe, said track shoes being disposed in closely spaced relationship longitudinally along the length of the bands and each having a longitudinal axis transverse to the longitudinal axis of the bands, each of said shoes including a pair of quarter-cylindrical lugs spaced longitudinally along the track shoe at each end thereof and projecting therefrom to overlap an adjacent shoe and thereby limit relative vertical displacement relative to the ground of the adjacent shoes in a portion of the track engaging the ground and also provide rolling contact of adjacent shoes whereby they are adapted to pivot relative to one another, each of said lugs extending in a direction transverse to the longitudinal axis of the track shoe with the lug on one side of the track shoe longitudinal axis at one end being offset along said longitudinal axis from the lug on the other side thereof at the same end by a distance equal to at least slightly more than the thickness of the lug on said other side, each of said lugs having a flat bearing surface disposed in a plane normal to the longitudinal axis of the track shoe, the bearing surface of the respective lugs on opposite sides of the longitudinal axis of the track shoe at each of the respective ends being disposed in opposite directions facing one another whereby each adjacent track shoe is provided with a lug adjacent to and cooperating with an associated side of a lug on the adjacent track shoe to limit relative horizontal displacement of the adjacent shoes.

14. An improved track shoe comprising:
(a) a pair of laterally spaced, longitudinally extending rubber track bands disposed in side-by-side relationship, each of said bands being provided with a plurality of steel reinforcing cables embedded therein and running along the longitudinal axis thereof;
(b) a plurality of high-strength metal bars extending transversely across said bands on the inside surface thereof, said bars being spaced longitudinally along said bands and anchored thereto to interconnect the same; and
(c) a plurality of ground engaging members disposed on the outside surface of said track bands, each said ground-engaging member being associated with a respective one of said metal track bars and together forming a track shoe, said track shoes being disposed in closely spaced relationship longitudinally along the length of said bands and having a longitudinal axis transverse to the longitudinal axis of said bands, each of said track shoes including:
(i) a pair of spaced-apart, ground-engaging flanges extending inwardly and upwardly to merge in an arch portion at each end of the track shoe;
(ii) a central relatively flat portion;
(iii) a pair of guide horns extending transversely across said arch portions, one being located at each end of said central flat portion and spaced from the lateral edge of said track shoe;
(iv) a pair of quarter-cylindrical lugs projecting outwardly from the curved face of each arch portion, one lug of each pair being on one side of the longitudinal axis of the track shoe and the other lug of the same pair being on the other side thereof, each said lug extending in a direction transverse to the longitudinal axis of the track shoe to engage an adjacent track shoe and thereby limit relative vertical displacement relative to the ground of the adjacent shoes of the ground engaging portion of the track and also provide rolling contact of adjacent shoes whereby they are adapted to pivot relative to one another, one such lug on one side of the track shoe longitudinal axis at one end being offset along such axis from the lug on the other side thereof at the same end by a distance equal to at least slightly more than the thickness of the lug on said other side, each of said lugs having a flat bearing surface disposed in a plane normal to the longitudinal axis of the track shoe, the bearing surface of the respective lugs on opposite sides of the longitudinal axis at respective opposite ends of the track shoe being in opposite directions facing one another to be in abutting relation and engageable upon selected horizontal displacement of the adjacent shoes.

15. An improved track shoe comprising:
(a) a pair of laterally spaced, longitudinally extending rubber track bands disposed side by side, each of said bands being provided with a plurality of steel reinforcing cables embedded therein and running along the longitudinal axis thereof;
(b) a plurality of high-strength metal track bars extending transversely across said bands and anchored thereto to interconnect the same, said bars being disposed on the inside surface of said track bands; and
(c) a plurality of ground-engaging members extending transversely across said bands and disposed on the outside surface thereof, each ground-engaging member being associated with a respective one of said track bars and together defining a track shoe, said track shoes being in closely spaced relationship longitudinally along the length of said track bands and having a longitudinal axis transverse to the longitudinal axis thereof, each of said track shoes including:
  (i) a pair of spaced-apart, ground-engaging edge flanges extending upwardly and inwardly to merge into an arch portion adjacent each end of said shoe;
  (ii) a central flat portion intermediate said ends; and
  (iii) a pair of guide horns extending transversely across respective ones of said arches, each guide horn being spaced from the track shoe's respective lateral edge and located at a position intermediate the central flat portion and said arch portion associated therewith;
  (iv) a pair of brackets secured to said track shoe and projecting outwardly from each of said arch portion, one bracket of each pair being on one side of the track shoe longitudinal axis and the other bracket of the same pair being on the other side, each of said bracket extending in a direction transverse to the longitudinal axis of the track shoe and one such bracket of one pair being spaced longitudinally along the shoe and offset along said longitudinal axis from the other bracket of the same pair; and
  (v) a quarter-cylindrical lug secured to each of its associated and adjacent bracket and projecting therefrom with its arcuate portion disposed outwardly from the curved face of said arch portion and extending in a direction transverse to the longitudinal axis of said track shoe to engage an adjacent track shoe and thereby limit relative vertical displacement relative to the ground of adjacent shoes in the ground engaging portion of the track and also provide rolling contact of adjacent shoes whereby they are adapted to pivot relative to one another, one lug on one side of the track shoe longitudinal axis at one end being offset with respect to the associated lug on the other side at the same end along said longitudinal axis by a distance equal to the thickness of the lug on said other side plus about $\frac{1}{16}''$, each of said lugs on opposite sides of the longitudinal axis of the track shoe having a flat bearing surface disposed in a plane normal to said axis, the bearing surface of the respective lugs at each of opposite ends of the track shoe being in opposite directions facing one another whereby in an assembled track shoe, each is provided with a lug adjacent to and cooperating with an associated lug on the other shoe to limit relative horizontal displacement of the adjacent shoes.

16. An improved track shoe comprising:
(a) a pair of laterally spaced, longitudinally extending rubber track bands each having a plurality of reinforcing cables embedded therein and running in a direction along the longitudinal axis thereof;
(b) a plurality of high strength metal track bars disposed transverse to said longitudinal axis and extending across said bands, each bar being disposed on the inside surfaces of the track bands and anchored thereto to interconnect the same;
(c) a plurality of ground-engaging members disposed on the outside surface of said track bands and anchored thereto, each track engaging member being associated with a respective one of the plurality of track bars, the track bar and track engaging member together defining a track shoe having a longitudinal axis transverse to the longitudinal axis of said bands, each of said track shoes including:
  (i) a pair of spaced-apart, ground-engaging edge flanges extending upwardly and inwardly to merge in an arch portion adjacent each end thereof;
  (ii) a pair of guide horns spaced longitudinally along said track intermeditae and adjacent respective ones of the arch portions and extending transversely thereto, said guide horn being spaced from the track shoe respective ends;
  (iii) a pair of quarter-cylindrical lugs spaced longitudinally along the track shoe adjacent each end thereof, one lug of each pair being on one side of the longitudinal axis of the track shoe and the other lug of the same pair being on the other side of the longitudinal axis, a bracket extension associated with each lug and having one radial face thereof secured, by said bracket extension, to said track shoe, said lugs extending with the arcuate portion disposed outwardly from the curved faces of each said arch portions and in a direction transverse to the longitudinal axis of said track shoe to engage an adjacent track shoe and thereby limit relative vertical displacement relative to the ground of adjacent track shoes on the portion of the track engageable with the ground and also provide rolling contact of adjacent shoes and thereby provide relative pivotal movement of adjacent shoes, one lug on one side of the track shoe longitudinal axis of one pair being offset along said longitudinal axis from an associate lug of the same pair on the other side thereof by a distance equal to the thickness of said other lug plus $\frac{1}{16}''$, each of said lugs having a flat bearing surface disposed in a plane normal to said longitudinal axis, said bearing surface of the respective lugs of each pair being in opposite directions facing one another whereby each adjacent track shoe is provided with a lug adjacent to and cooperating with an associated side of an adjacent lug on an adjacent track shoe to limit relative horizontal displacement of adjacent track shoes.

References Cited
UNITED STATES PATENTS

| | | | |
|---|---|---|---|
| 1,230,504 | 6/1917 | Nelson | 305—48 X |
| 1,632,674 | 6/1927 | Pearson. | |
| 2,063,762 | 12/1936 | Schultz | 305—40 |
| 2,362,638 | 11/1944 | Kilborn | 305—37 |
| 2,487,813 | 11/1949 | Knox | 305—38 |
| 3,128,130 | 4/1964 | Harris | 305—53 |

FOREIGN PATENTS 1,081,928  6/1954  France.

RICHARD J. JOHNSON, *Primary Examiner.*

BENJAMIN HERSH, *Examiner.*

UNITED STATES PATENT OFFICE
CERTIFICATE OF CORRECTION

Patent No. 3,387,897　　　　　　　　　　　　　　　　　　　June 11, 1968

Kevin William Reid

It is certified that error appears in the above identified patent and that said Letters Patent are hereby corrected as shown below:

In the heading to the printed specification, lines 4 to 7, "Canadian International Paper Company, Montreal, Quebec, and North Shore Paper Company, Montreal, Quebec, Canada, and Abitibi St. Anne Paper Ltd., all corporations of Quebec" should read -- Canadian International Paper Company, Montreal, Quebec, Canada, Quebec North Shore Paper Company, Montreal, Quebec, Canada, and Ste. Anne Paper Company, Limited, Beaupre, Quebec, Canada, all corporations of Quebec --.

Signed and sealed this 17th day of March 1970.

(SEAL)
Attest:

Edward M. Fletcher, Jr.　　　　　　　　　　WILLIAM E. SCHUYLER, JR.
Attesting Officer　　　　　　　　　　　　　　　　Commissioner of Patents